United States Patent [19]

Takahashi et al.

[11] 4,250,156

[45] Feb. 10, 1981

[54] PROCESS FOR PREPARING CARBONYL SULFIDE

[75] Inventors: Nobuo Takahashi, Shizuoka; Masamichi Shimizu, Abiko; Kazushige Hirao, Hamamatsu; Sadayoshi Matsui, Shimizu, all of Japan

[73] Assignee: Ihara Chemical Industry Co., Ltd., Tokyo, Japan

[21] Appl. No.: 131,668

[22] Filed: Mar. 19, 1980

Related U.S. Application Data

[63] Continuation of Ser. No. 67,666, Aug. 20, 1979, abandoned.

[51] Int. Cl.$^3$ .............................................. C01B 31/26
[52] U.S. Cl. .................................................. 423/416
[58] Field of Search ........................ 423/414, 415, 416

[56] References Cited

U.S. PATENT DOCUMENTS

| | | | |
|---|---|---|---|
| 2,983,580 | 5/1961 | Kerr | 423/416 |
| 3,764,661 | 10/1973 | Kanazawa et al. | 423/416 |
| 4,078,045 | 3/1978 | Nakayama et al. | 423/416 |

OTHER PUBLICATIONS

Kimura et al, Development and Industrialization of the Herbicide "Saturn", Research and Development in Japan Awarded The Okochi Memorial Prize, 1973, pp. 64–67.

*Primary Examiner*—Earl C. Thomas
*Attorney, Agent, or Firm*—Armstrong, Nikaido, Marmelstein & Kubovcik

[57] ABSTRACT

Carbonyl sulfide is prepared with an enhanced purity by a process wherein carbon monoxide is caused to bubble through molten sulfur maintained at a temperature of from 300° to 440° C.; and, the resulting gaseous mixture is maintained at a reaction temperature exceeding 510° C. but not higher than 650° C.

10 Claims, No Drawings

PROCESS FOR PREPARING CARBONYL SULFIDE

This is a continuation of application Ser. No. 067,666 filed Aug. 20, 1979, now abandoned.

BACKGROUND OF THE INVENTION

1. Field of the Invention

This invention relates to a process for the preparation of carbonyl sulfide, which is useful as a raw material for the production of pesticides, pharmaceuticals and other chemicals, by reacting carbon monoxide with sulfur in the vapor phase.

2. Description of the Prior Art

Many proposals have been heretofore made to produce carbonyl sulfide with a high purity and at an enhanced yield. It is a recognition common to all of these proposals that, when the vapor phase reaction of sulfur with carbon monoxide is carried out at an elevated temperature, e.g., exceeding 510° C., carbonyl sulfide is inevitably thermally decomposed thereby producing carbon dioxide and carbon disulfide, and thus, the vapor phase reaction of sulfur with carbon monoxide should be carried out at a temperature of not higher than 510° C. and as low as practically possible. For example, German Auslegeschrift No. 1,222,024 discloses a process for preparing carbonyl sulfide of a high purity wherein carbon monoxide is reacted with sulfur in the vapor phase in the absence of a catalyst at a temperature of from 350° to 510° C. Several processes are also known wherein the vapor phase reaction of carbon monoxide with sulfur is effected in the presence of a catalyst at a moderate temperature, for example, in the presence of an aluminosilicate at a temperature of from 500° to 900° F., i.e., from 260° to 483° C. (U.S. Pat. No. 2,983,580); in the presence of a metal sulfide selected from $Na_2S$, $K_2S$, NiS, CrS, CoS, WS and SnS at a temperature of 250° to 450° C. (U.S. Pat. No. 3,764,661); and in the presence of an alkaline earth metal compound at a temperature of from 250° to 450° C. (U.S. Pat. No. 4,078,045).

However, the above-mentioned process wherein the vapor phase reaction is carried out in the absence of a catalyst at a temperature of from 350° to 510° C. is not advantageous in that, first, the reaction rate is so low that a substantially long period is required for the completion of the reaction and thus a substantially large reactor is needed, and secondly, the reaction product contains a salient amount of unreacted carbon monoxide.

The above-mentioned processes wherein the vapor phase reaction is effected in the presence of a catalyst are advantageous in that a reaction product of a high purity can be obtained at a relatively low reaction temperature and in a relatively short reaction time. These processes are, however, not completely satisfactory in that, first, the catalyst must be completely dehydrated prior to the use thereof, because water, if present, causes a side reaction of decomposing carbonyl sulfide into hydrogen sulfide and carbon dioxide; secondly, sulfur tends to be deposited onto the catalyst particles which deposition leads to reduction in the catalyst activity and to clogging of the catalyst bed; and thirdly, most of the conventional catalysts exhibits a relatively short catalyst life.

SUMMARY OF THE INVENTION

It now has been found that carbonyl sulfide with a high purity can be produced even at a temperature exceeding 510° C. in the absence of a catalyst by preparing a gaseous mixture of carbon monoxide and sulfur by a procedure wherein carbon monoxide is caused to bubble through molten sulfur maintained at a temperature of from 300° to 440° C. It is surprising that, although the so prepared gaseous mixture of carbon monoxide and sulfur is maintained at a temperature exceeding 510° C. in the reaction zone, the thermal decomposition of carbonyl sulfide occurs only to a negligible extent.

In accordance with the process of the present invention, carbon monoxide is caused to bubble through molten sulfur maintained at a temperature of from 300° to 440° C., and the resulting gaseous mixture is maintained at a temperature exceeding 510° C. but not higher than 650° C.

PREFERRED EMBODIMENTS OF THE INVENTION

A gaseous mixture of carbon monoxide and sulfur, to be fed to a reaction zone, is prepared by causing carbon monoxide to bubble through molten sulfur. The molten sulfur should be maintained at a temperature of from 300° to 440° C. When carbon monoxide is caused to bubble through the molten sulfur, molten sulfur is entrained by the bubbles of carbon monoxide whereby the evaporation of sulfur is accelerated and the desired gaseous mixture is prepared. The resulting gaseous mixture is comprised of (1) sulfur entrained and evaporated by the carbon monoxide bubbles, (2) sulfur evaporated from the free surface of the molten sulfur, (3) carbon monoxide and (4) carbonyl sulfide formed upon bubbling of carbon monoxide. When the temperature of the molten sulfur is lower than 300° C., the amount of sulfur evaporated is too small. In contrast, at the temperature exceeding approximately 440° C., sulfur evaporates to an excessive extent (the boiling point of sulfur is 444.6° C.), and hence, it becomes costly to recover unreacted sulfur from the gaseous reaction product withdrawn from the reactor. The temperature of the molten sulfur is preferably within the range of from 330° to 410° C., more preferably from 350° to 380° C.

The amount of sulfur evaporated varies depending upon the amount of carbon monoxide blown into the molten sulfur and the temperature of the molten sulfur. Particularly, the amount of sulfur evaporated is approximately in proportion to the amount of carbon monoxide blown into the molten sulfur. Accordingly, the proportion of sulfur to carbon monoxide in the resulting gaseous mixture can be maintained substantially constant even when the flow rate in volume of carbon monoxide blown into the molten sulfur fluctuates, and, the proportion of sulfur to carbon monoxide can be controlled by varying the temperature of the molten sulfur.

The molar ratio of sulfur to carbon monoxide should be at least approximately 1.0. By the term "molar ratio of sulfur to carbon monoxide" herein used is meant the ratio of the number of sulfur atoms to the number of carbon monoxide molecules. When the molar ratio is smaller than this, the gaseous reaction product withdrawn from the reactor contains a salient amount of unreacted carbon monoxide, leading to reduction in the purity of the carbonyl sulfide product. The molar ratio of at least approximately 1.0 is obtained by maintaining the molten sulfur at a temperature of at least 300° C. The molar ratio of sulfur to carbon monoxide is preferably in the range of from 1.0 to 6.0, more preferably in the range of from 1.4 to 3.0, which ranges are obtainable at the molten sulfur temperature of from 300° to 410° C. and from 350° to 380° C., respectively. The optimum molar ratio is approximately 1.5, which is obtainable at the molten sulfur temperature of approximately 360° C.

Since the amount of sulfur evaporated is approximately in proportion to the amount of carbon monoxide blown into the molten sulfur, the amount of the carbon monoxide is not particularly limited but may be varied depending upon the capacity of the reactor used. The flow rate of carbon monoxide, the pressure thereof and the position at which the carbon monoxide is blown into the molten sulfur should preferably be determined so that the molten sulfur is caused to be in a turbulent state in the vicinity close to the free surface, from which the molten sulfur is splashed in the form of not large but minute particulates. Thus, carbon monoxide may be blown into the molten sulfur at a suitable depth which varies depending upon the flow rate and pressure of the carbon monoxide, which depth is usually in the range of from 5 mm to 50 cm below the free surface of the molten sulfur. When the blowing depth is too small, the desired amount of sulfur does not evaporate. In contrast, when the blowing depth is too large, the desired gaseous mixture cannot be formed unless the blowing pressure is increased to a great extent. Usually, the flow rate of the carbon monoxide and the blowing pressure (gauge pressure) may be in the ranges of from 0.1 to 10 $Nm^3/$ hr, per $m^2$ of the cross-section of the reactor, and from 1 $cmH_2O$ to 100 $cmH_2O$, respectively.

The gaseous mixture formed in the above-mentioned manner is maintained at a temperature exceeding 510° C., but not higher than 650° C., whereby sulfur and carbon monoxide are reacted with each other. The reaction temperature is preferably in the range of from 530° to 600° C. At the reaction temperature of not higher than 510° C., the reaction rate is very low. In contrast, at the reaction temperature higher than 650° C., the thermal decomposition of carbonyl sulfide occurs to a considerable extent thereby producing salient amounts of carbon dioxide and carbon disulfide.

The reaction period, i.e., the contact time, may be varied depending on the reaction temperature, and usually in the range of one second to five minutes. Preferably, the contact time is in the range of from these seconds to twenty seconds. Contact time exceeding five minutes invites the thermal decomposition of carbonyl sulfide. The vapor phase reaction is carried out in either atmospheric or superatmospheric pressure. It is convenient, however, to effect the reaction at a slightly superatmospheric pressure which is generated by blowing carbon monoxide into the molten sulfur.

The type of the reactor used is not particularly limited. One preferable type is a vertically arranged cylindrical reactor provided with a molten sulfur reservoir at the bottom thereof. The wall of the reactor may be made of or lined with an anticorrosion material, such as titanium or a titanium-rich alloy.

The gaseous reaction product withdrawn from the reactor contains a salient amount of sulfur vapor. Such gaseous reaction product may be purified as follows. The gaseous reaction product is cooled preferably to a temperature of from 120° to 150° C. whereby a substantial part of the sulfur vapor is condensed to be separated. Then, the gaseous reaction product, which contains a minor amount of sulfur in the form of mist, is brought into contact with molten sulfur maintained preferably at a temperature of from 120° to 150° C. whereby the mist of sulfur is substantially removed from the gaseous reaction product. Thereafter, the gaseous reaction product is passed through a column packed with anticorrosive packing materials thereby to remove the remaining sulfur. If desired, the gaseous reaction product may be brought into contact with water thereby to remove completely the remaining sulfur.

The gaseous reaction product, from which unreacted sulfur has been recovered, is preferably comprised of, by weight, at least 97% of carbonyl sulfide, less than 2% of carbon monoxide, less than 0.2% of carbon dioxide and less than 0.2% of carbon disulfide. The gaseous reaction product of such a composition may be further purified in a conventional manner, if desired.

The advantages of the process of the invention are summarized as follows. First, although the vapor phase reaction is conducted at a higher temperature compared with those employed in conventional processes, carbonyl sulfide is obtained with a high purity. Even if the required amounts of gaseous sulfur and carbon monoxide are blended with each other and the resulting gaseous mixture is maintained at a temperature similar to that employed in the process of the invention, the resulting carbonyl sulfide is of a far lower purity. This is because the thermal decomposition of carbonyl sulfide produced would occur to a great extent. It is surprising that, when carbon monoxide is caused to bubble through molten sulfur and the resulting gaseous mixture is placed under the stated reaction conditions, the thermal decomposition of carbonyl sulfide occurs only to a negligible extent thereby obtaining carbonyl sulfide with a high purity. It is presumed that the sulfur present in the gaseous mixture prepared in the process of the invention is of a special molecular configuration which is not liable to be thermally decomposed.

Secondly, the proportion of sulfur to carbon monoxide present in the gaseous mixture does not vary to an appreciable extent, even when the flow rate in volume of carbon monoxide blown into the molten sulfur fluctuates. Therefore, the proportion of sulfur to carbon monoxide can be easily maintained at a constant. Furthermore, the proportion of sulfur to carbon monoxide can be easily controlled merely by varying the temperature of the molten sulfur. Thirdly, the contact time can be shortened and the reaction apparatus can be of a minimal size. Fourthly, due to no use of a catalyst, the reaction apparatus is not complicated and both operation and equipment costs are low. Fifthly, the molten sulfur is maintained at a temperature lower than the boiling point and hence, the quantity of heat is small.

The invention will be further illustrated by the following examples.

EXAMPLE 1

A vertically arranged cylindrical reactor having an inner diameter of 5 cm, made of titanium, and provided with a molten sulfur pool at the bottom was used. Carbon monoxide was continuously blown into the molten sulfur at a position 3 cm below the free surface of the molten sulfur at a flow rate of 3 moles/hr and a gauge pressure of 0.2 $kg/cm^2$. The molten sulfur was maintained at a temperature of approximately 360° C. The molten sulfur was in a turbulent state in the vicinity close to the free surface. The free surface of the molten sulfur was covered by bubbles formed of thin molten sulfur films, from which surface minute particulates of molten sulfur were splashed. The molar ratio of sulfur to carbon monoxide present in the gaseous mixture formed from the bubbles was 1.5. The gaseous mixture was maintained at a temperature of 575° C. in the reaction zone above the molten sulfur pool whereby sulfur and carbon monoxide were reacted with each other. The reaction time was approximately 4 seconds. The gaseous reaction product was cooled to an ambient temperature whereby unreacted sulfur is condensed to be recovered. The resultant product had the composition shown in Table I, below.

For a comparison purpose, a flow of carbon monoxide and a flow of sulfur vapor were joined and blended together at a temperature of 420° C. at the S/CO molar ratio of 1.5/1. The resultant gaseous mixture was placed under conditions similar to those mentioned above whereby carbon monoxide and sulfur were reacted with each other. The gaseous reaction product was purified to remove sulfur therefrom in a manner similar to that mentioned above. The resultant product had the composition shown in Table I, below.

TABLE I

| Run No. | Composition of Gaseous product (wt. %) | | | |
|---|---|---|---|---|
| | COS | CO | $CO_2$ | $CS_2$ |
| 1-1 | 97.5 | 1.9 | 0.35 | 0.25 |
| 1-2 (Comparative) | 32.3 | 8.5 | 30.2 | 29.0 |

EXAMPLE 2

This example illustrates the influence of the temperature of the molten sulfur upon the purity of carbonyl sulfide produced.

Following a procedure similar to that mentioned in Example 1, carbon monoxide was caused to bubble at a flow rate of 0.5 mole/hr through molten sulfur maintained at various temperatures shown in Table II, below. Each gaseous mixture, so obtained, was maintained at a temperature of 550° C. for a period of 8 seconds. The respective gaseous reaction products were purified to remove unreacted sulfur therefrom in a manner similar to that mentioned in Example 1. The resultant gaseous products had the compositions shown in Table II, below.

TABLE II

| Run No. | Temperature of molten S (°C.) | S/CO ratio in gaseous mixture (by mole) | Composition of gaseous product (wt. %) | | | |
|---|---|---|---|---|---|---|
| | | | COS | CO | $CO_2$ | $CS_2$ |
| 2-1 (Comparative) | 290 | 0.4 | 68.0 | 31.8 | 0.1 | 0.1 |
| 2-2 | 326 | 1.1 | 93.1 | 6.5 | 0.2 | 0.2 |
| 2-3 | 356 | 1.5 | 97.9 | 1.8 | 0.15 | 0.15 |
| 2-4 | 400 | 5.2 | 97.5 | 2.2 | 0.15 | 0.15 |

EXAMPLE 3

This example illustrates the influence of the reaction temperature upon the purity of carbonyl sulfide produced.

Following a procedure similar to that mentioned in Example 1, gaseous mixtures of sulfur and carbon monoxide were prepared and the respective gaseous mixtures were maintained at various temperatures shown in Table III, below, whereby sulfur and carbon monoxide were reacted with each other. The respective gaseous reaction products were purified to remove unreacted sulfur therefrom in a manner similar to that mentioned in Example 1. The resulting gaseous products had the compositions shown in Table III, below.

TABLE III

| Run No. | Reaction temperature (°C.) | Composition of gaseous product (wt. %) | | | |
|---|---|---|---|---|---|
| | | COS | CO | $CO_2$ | $CS_2$ |
| 3-1 (Comparative) | 500 | 59.5 | 40.15 | 0.2 | 0.15 |
| 3-2 | 520 | 92.5 | 7.15 | 0.2 | 0.15 |
| 3-3 | 530 | 97.7 | 1.9 | 0.2 | 0.2 |
| 3-4 | 550 | 98.0 | 1.7 | 0.15 | 0.15 |
| 3-5 | 580 | 97.5 | 2.0 | 0.3 | 0.2 |
| 3-6 | 600 | 96.5 | 2.9 | 0.35 | 0.25 |
| 3-7 | 630 | 93.5 | 3.5 | 1.7 | 1.3 |
| 3-8 | 650 | 90.1 | 3.1 | 3.8 | 3.0 |
| 3-9 (Comparative) | 670 | 33.6 | 3.0 | 32.1 | 31.3 |

What we claim is:

1. A process for preparing carbonyl sulfide wherein carbon monoxide is reacted with sulfur in the vapor phase, which comprises the steps of:
    causing carbon monoxide to bubble through molten sulfur maintained at a temperature of from 300° to 440° C., and;
    maintaining the resulting gaseous mixture at a temperature exceeding 510° C. but not higher than 650° C.

2. A process according to claim 1 wherein the molten sulfur is maintained at a temperature of from 330° to 410° C.

3. A process according to claim 2 wherein the proportion of sulfur to carbon monoxide, both present in the gaseous mixture, is in the range of from 1.0/1 to 6.0/1 by mole.

4. A process according to claim 1 wherein the molten sulfur is maintained at a temperature of from 350° to 380° C.

5. A process according to claim 4 wherein the proportion of sulfur to carbon monoxide, both present in the gaseous mixture, is in the range of from 1.4/1 to 3.0/1 by mole.

6. A process according to claim 1, 2 or 4 wherein the carbon monoxide is caused to bubble through the molten sulfur by blowing the carbon monoxide at a flow rate of from 0.1 to 10 $Nm^3$/hr, per $m^2$ of the cross-section of the reactor, and a blowing pressure (gauge pressure) of from 1 $cmH_2O$ to 100 $cmH_2O$ into the molten sulfur at a position of from 5 mm to 50 cm below the free surface thereof; the flow rate of the carbon monoxide, the blowing pressure thereof and the position at which the carbon monoxide is blown into the molten sulfur being determined so that the molten sulfur is caused to be in a turbulent state in the vicinity close to the free surface, from which the molten sulfur is splashed in the form of minute particulates.

7. A process according to claim 1 wherein said gaseous mixture is maintained at a temperature of from 530° to 600° C.

8. A process according to claim 1 wherein said gaseous mixture is maintained at said reaction temperature for a period of from one second to five minutes.

9. A process according to claim 1 wherein said reaction of sulfur with carbon monoxide is effected in a reactor, the wall of which is made of titanium or a titanium-rich alloy, or the inner wall of which is lined with titanium or a titanium-rich alloy.

10. A process according to claim 1 which further comprises the steps of:
    cooling the gaseous reaction product thereby condensing the unreacted sulfur, and
    recovering the condensed sulfur with water.

* * * * *

UNITED STATES PATENT AND TRADEMARK OFFICE
Certificate

Patent No. 4,250,156                        Patented February 10, 1981

Nobuo Takahashi, Masamichi Shimizu, Kazushige Hirao, and Sadayoshi Matsui

Application having been made by Nobuo Takahashi, Masamichi Shimizu, Kazushige Hirao, and Sadayoshi Matsui, the inventors named in the patent above-identified, and Ihara Chemical Industry Co., Ltd., the assignee, for the issuance of a certificate under the provisions of Title 35, Section 256, of the United States Code, adding the name of Shigeru Ogawa as a joint inventor, and a showing and proof of facts satisfying the requirements of the said section having been submitted, it is this 6th day of Mar., 1984, certified that the name of the said Shigeru Ogawa is hereby added to the said patent as a joint inventor with the said Nobuo Takahashi, Masamichi Shimizu, Kazushige Hirao, and Sadayoshi Matsui.

Fred W. Sherling,
*Associate Solicitor.*